United States Patent [19]
Lee

[11] Patent Number: 5,449,884
[45] Date of Patent: Sep. 12, 1995

[54] OVERHEATING PREVENTION APPARATUS OF A BOILING CLOTHES WASHING MACHINE AND METHOD THEREOF

[75] Inventor: Hwan Lee, Kyungki-do, Rep. of Korea

[73] Assignee: Samsung Electronics Co., Ltd., Suwon, Rep. of Korea

[21] Appl. No.: 997,220

[22] Filed: Dec. 28, 1992

[30] Foreign Application Priority Data

Jul. 9, 1992 [KR] Rep. of Korea .............. 92-12605 U
Jul. 21, 1992 [KR] Rep. of Korea ................ 92-12930

[51] Int. Cl.$^6$ .............................................. H05B 1/02
[52] U.S. Cl. .................................. 219/497; 219/501; 219/506; 219/494; 374/102; 68/12.03; 68/15
[58] Field of Search .............. 219/491, 494, 497, 499, 219/501, 506; 68/12.03, 15, 209; 374/102, 107; 340/588, 589

[56] References Cited

U.S. PATENT DOCUMENTS

| | | | |
|---|---|---|---|
| 3,614,385 | 10/1971 | Horstmann | 219/303 |
| 3,982,098 | 9/1976 | Trostler | 219/501 |
| 4,088,871 | 5/1978 | Coulmance et al. | 219/497 |
| 4,405,855 | 9/1983 | Kolle et al. | 219/501 |
| 4,580,421 | 4/1986 | Babuin et al. | 68/12 R |
| 4,668,856 | 5/1987 | Axelson | 219/497 |
| 4,752,671 | 6/1988 | Foster et al. | 219/330 |
| 4,929,930 | 5/1990 | Rezabek | 340/622 |
| 5,099,108 | 3/1992 | Kimura et al. | 219/497 |

FOREIGN PATENT DOCUMENTS

| | | | |
|---|---|---|---|
| 0277551 | 8/1988 | European Pat. Off. | |
| 0014286 | 2/1978 | Japan | 219/494 |

*Primary Examiner*—Mark H. Paschall
*Attorney, Agent, or Firm*—Burns, Doane, Swecker & Mathis

[57] ABSTRACT

An overheating prevention apparatus of a boiling water washing machine including a heater for boiling clothes with hot water. The apparatus includes a first thermistor for sensing the temperature of the heater; a heater temperature sensing section for generating a first temperature sensing signal corresponding to the temperature of the heater; a second thermistor for sensing the temperature of washing water supplied to a tub; a water temperature sensing section for generating a second sensing signal corresponding to the temperature of the washing water; a first temperature comparing section for comparing the first temperature sensing signal with a reference signal considered as an overheating temperature signal; a second temperature comparing section for comparing the second temperature sensing value with the sum of the first temperature sensing value and a predetermined value; a temperature increment calculating section for calculating temperature increments for a predetermined time period by the first temperature sensing signal, and comparing the calculated value with a predetermined reference value a load drive section and a power supply switching section including at least two relay means for operating the heater.

14 Claims, 5 Drawing Sheets

OVERHEATING PREVENTION APPARATUS OF A BOILING CLOTHES WASHING MACHINE AND METHOD THEREOF

BACKGROUND OF THE INVENTION

1. Field of the Invention

The present invention is related to providing an overheating prevention apparatus in a boiling clothes washing machine including a heater for laundering clothes with hot water, and a method thereof.

2. Related Art

A conventional fully automatic washing machine has been developed to provide a heating apparatus in the tub in order to process clothes with warm water having a temperature of about 50° C. FIG. 1 illustrates a heater drive control circuit for the conventional washing machine. A microcomputer 10 controls all the operations of the washing machine according to a control program. A load drive section 20, which includes a first transistor 21 and a second transistor 22, outputs power supply switching signals to a power supply switching section 30 so as to control the operating cycles of the washing machine according to the control signal provided from the microcomputer 10. As far as the present invention is concerned, only the on/off operation of the heater 40 as controlled by the load drive section 20 will be described herein for brevity of explanation. The power supply switching section 30 includes a first relay 31 and a second relay 32 to connect or disconnect each terminal of the power supply with each corresponding terminal of the heater 40 according to the switching signal provided from the load drive section 20.

However, in the conventional washing machine as described above, there is the possibility that the clothes will become damaged or that a fire may take place if the power supply is applied to the heather 40 when there is an insufficient amount of the washing water in the tub.

An apparatus, supplied with a plurality of water level sensors and a thermostatic sensor to control the level and temperature of the washing water and also the quantity of detergent, is disclosed in U.S. Pat. No. 4,580,421. This apparatus is designed to automatically cut off the power supply to the heater 40 by operation of the thermostatic sensor when the temperature of the washing water reaches a predetermined value. One object of the disclosed device is to reduce the washing machine's consumption of electricity, water and detergent. But the U.S. patent does not disclose a definite means for preventing the heater from overheating or cutting off the power supply to the heater when the heater becomes overheated due to an insufficient amount of the washing water present in the tub. Thus, the risk of damage to the clothes and the risk of fire caused by the overheating of the heater still exists. Further, when terribly dirty clothes are boiled in washing water which is heated to around the boiling temperature, benefits (such as sterilization, deodorization and bleaching) are achieved. Such a boiling clothes washing machine requires an apparatus for preventing the heater from overheating which may be caused by an increase of power consumption at the heater.

SUMMARY OF THE INVENTION

It is an object of the invention to provide an overheating prevention system applicable to a boiling water clothes washing machine including a heater.

It is another object of the invention to provide an overheating prevention system of a boiling water clothes washing machine which is adapted to monitor the water level using temperature increments calculated by a microcomputer without additional water level sensing means, thereby preventing risk of damage to the clothes or a fire.

It is still another object of the invention to provide an overheating prevention system of a boiling water clothes washing machine for preventing a heater from overheating regardless of a malfunction of the main controller.

According to one aspect of the invention, an overheating prevention apparatus in a boiling clothes washing machine including a heater for boiling the clothes with hot water comprises: a first thermistor for sensing the temperature of the heater; a heater temperature sensing section for generating a first temperature sensing signal corresponding to the temperature of the heater; a second thermistor for sensing the temperature of the washing water supplied to the tub; a water temperature sensing section for generating a second sensing signal corresponding to the temperature of the washing water; a first temperature comparing section for comparing the first temperature sensing signal with a reference signal considered an overheating temperature signal; a second temperature comparing section for comparing the second temperature sensing value with the sum of the first temperature sensing value and a predetermined value; a temperature increment circulating section for calculating temperature increments during a predetermined time period by the first temperature sensing signal, and comparing the calculated value with a predetermined reference value; an AND gate for receiving the signals from the second temperature comparing section and the temperature increment calculating section; an OR gate for receiving the signals from the AND gate and the first temperature comparing section; a load drive section including at least two transistors for receiving the signal from the OR gate to be turned "on" or "off"; and, a power supply switching section including at least two relay means for operating the heater during their "on" position state.

In the apparatus described above, the heater temperature sensing section, the water temperature sensing section, the first and second temperature comparing section and temperature increment calculating section can be embodied not only in a microcomputer but also in an additional hardware apparatus separate from the microcomputer. Hereinafter, those sections will be described as function means of the microcomputer. In a preferred embodiment, the reference signal applied to the first temperature comparing section can be set at a temperature which is between 105° C.–107° C. The predetermined value in the second temperature comparing section is preferably set at 30° C., and the predetermined reference value in the temperature increment calculating section is preferably set at 13° C. per 30 seconds.

According to another aspect of the invention, there is an overheating prevention method for a boiling water clothes washing machine including a heater for boiling clothes with hot water, comprising the steps of: determining whether the heater temperature is higher than a predetermined value; determining whether the temperature increments of the heater for a predetermined time period are higher than a predetermined value, when the heater temperature is below the predetermined value;

determining whether a predetermined amount of time has elapsed, when the temperature increment value of the heater is higher than the predetermined value; determining whether the water temperature is higher than the heater temperature by a predetermined value, when the predetermined amount of time has not elapsed; cutting off the power supply to the heater and issuing an alarm when the heater temperature is higher than the predetermined value or when the water temperature is not higher than the heater temperature by the predetermined value; and, performing a boiling water washing cycle, when the predetermined amount of time has elapsed, or the water temperature is higher than the heater temperature by the predetermined value.

In the method described above, the predetermined value for determining the heater temperature is preferably set between 105° C.–107° C. and the predetermined value for determining the temperature step increment is preferably set at 13° C. per 30 seconds. The predetermined time interval is preferably set at 30 seconds and the predetermined value in determining the water temperature is preferably set at 30° C.

The novel and distinctive features of the invention are set forth in the claims appended to the present application. The invention itself, however, together with further objects and advantages thereof, may be best understood by reference to the following description and accompanying drawings in which:

DETAILED DESCRIPTION OF DRAWINGS

Figure 1:
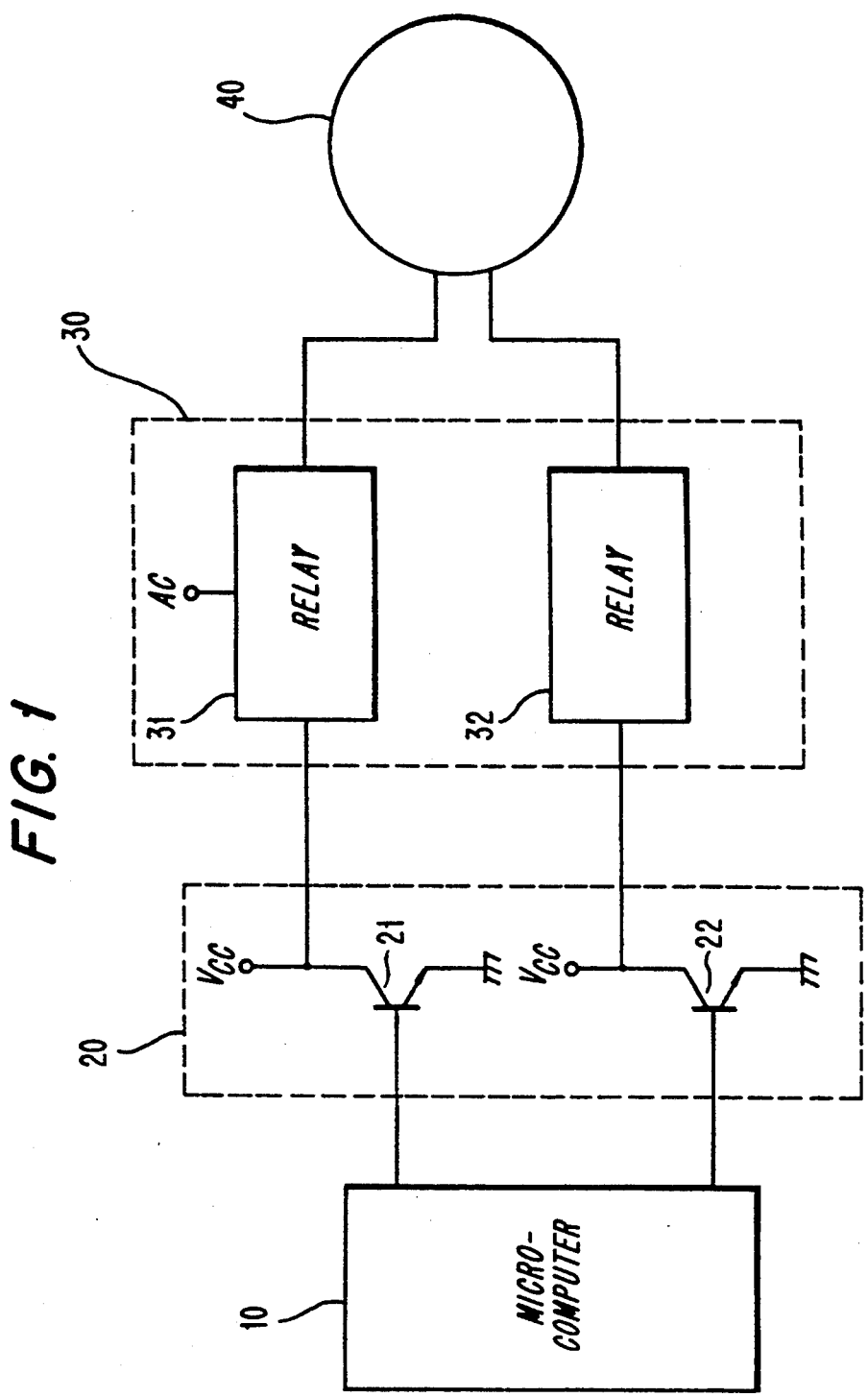
FIG. 1 is a conventional heater drive control circuit of a clothes washing machine including a heater.
Figure 2:
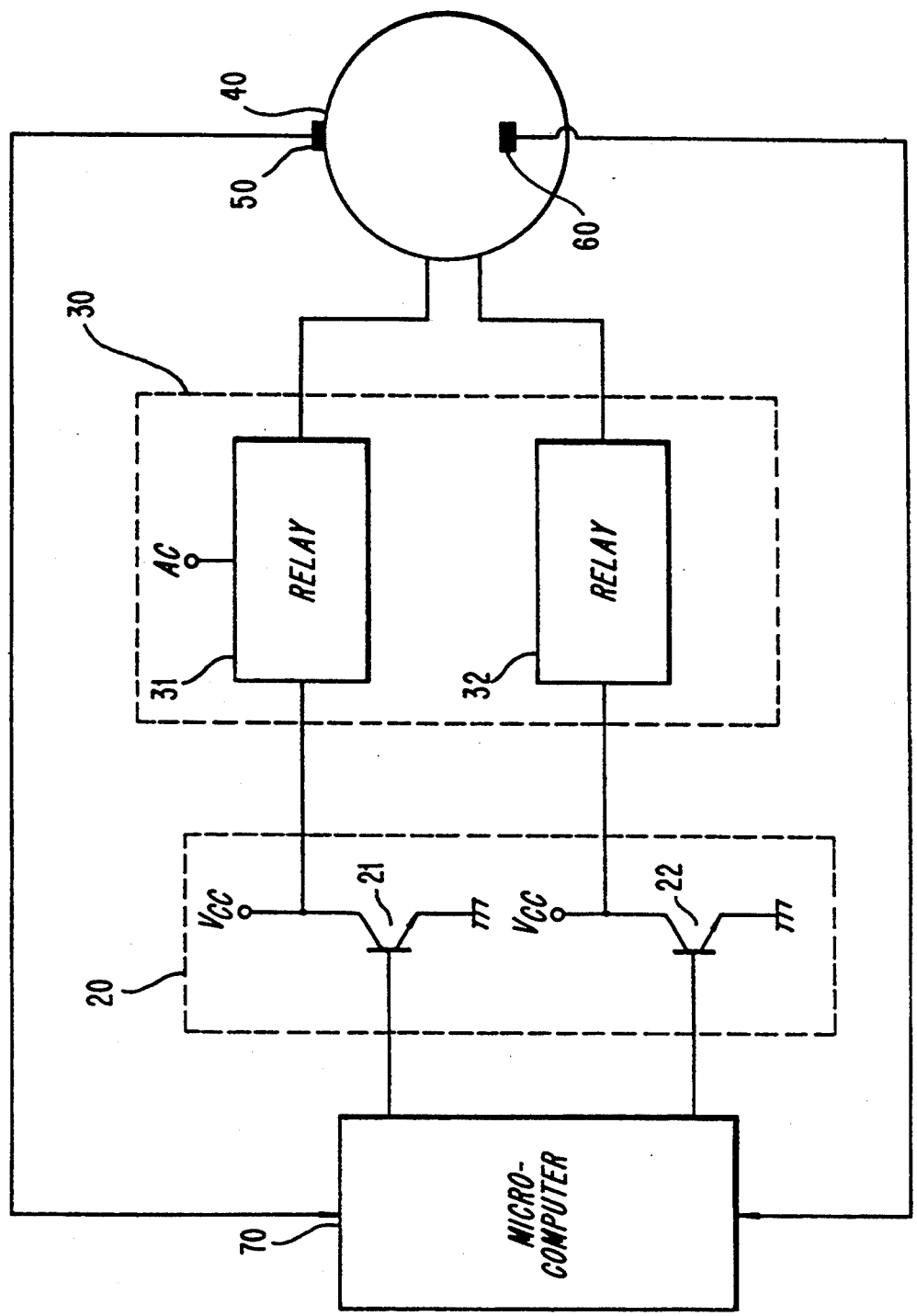
FIG. 2 is a heater drive control circuit according to a first preferred embodiment of the invention.
Figure 3:
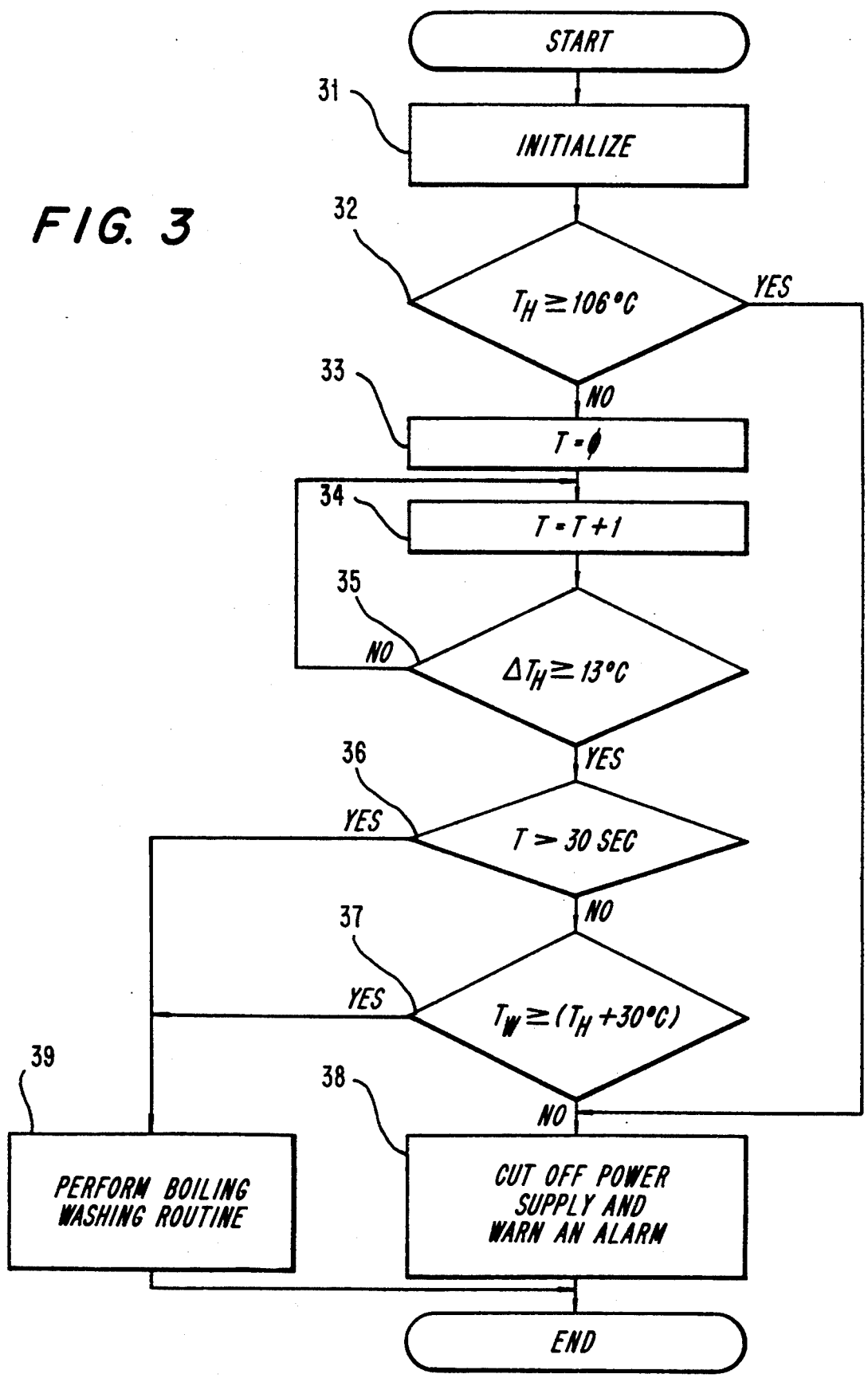
FIG. 3 is a flow chart illustrating the overheating prevention method of the invention.
Figure 4:
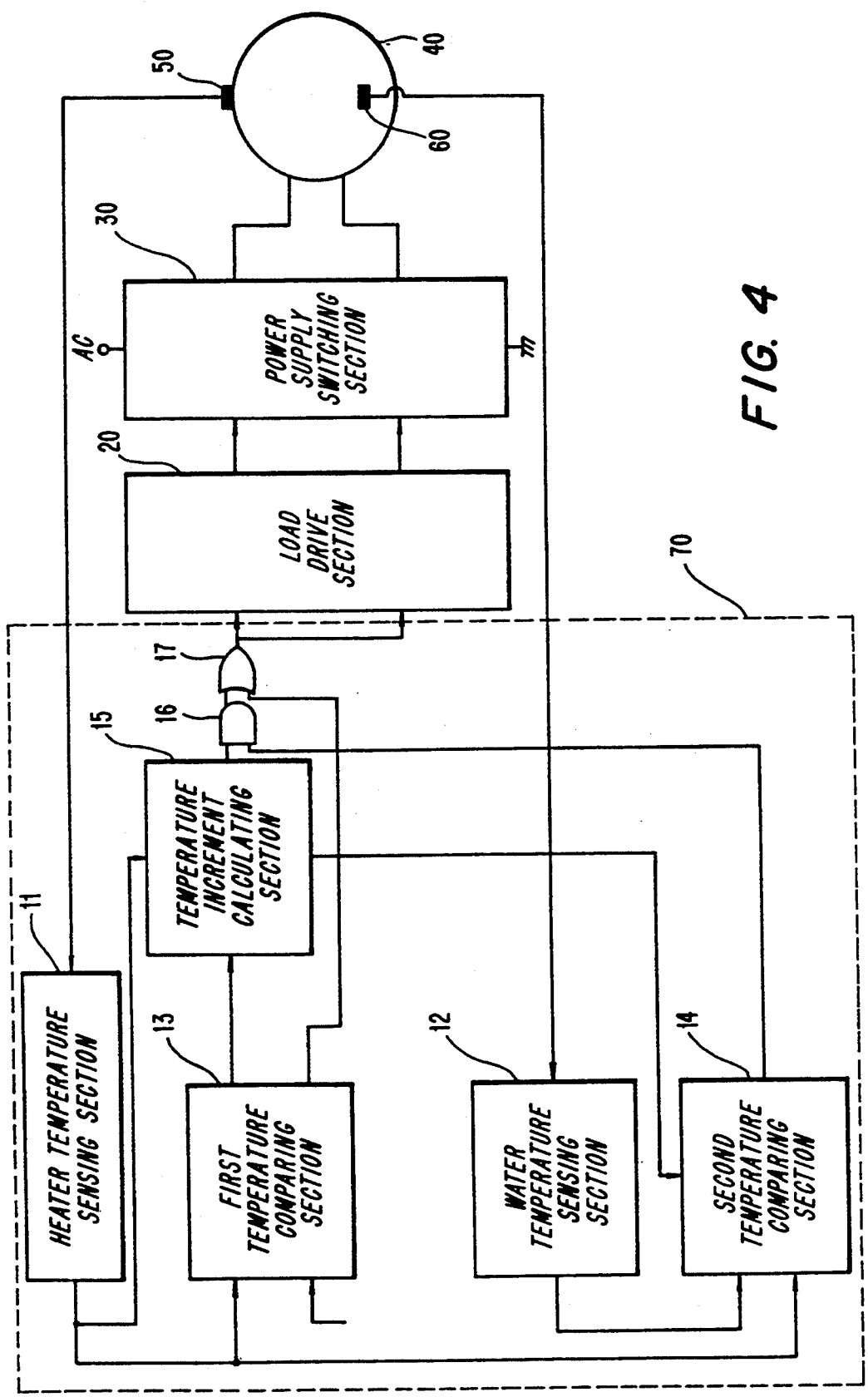
FIG. 4 is a functional block diagram of the invention.
Figure 5:
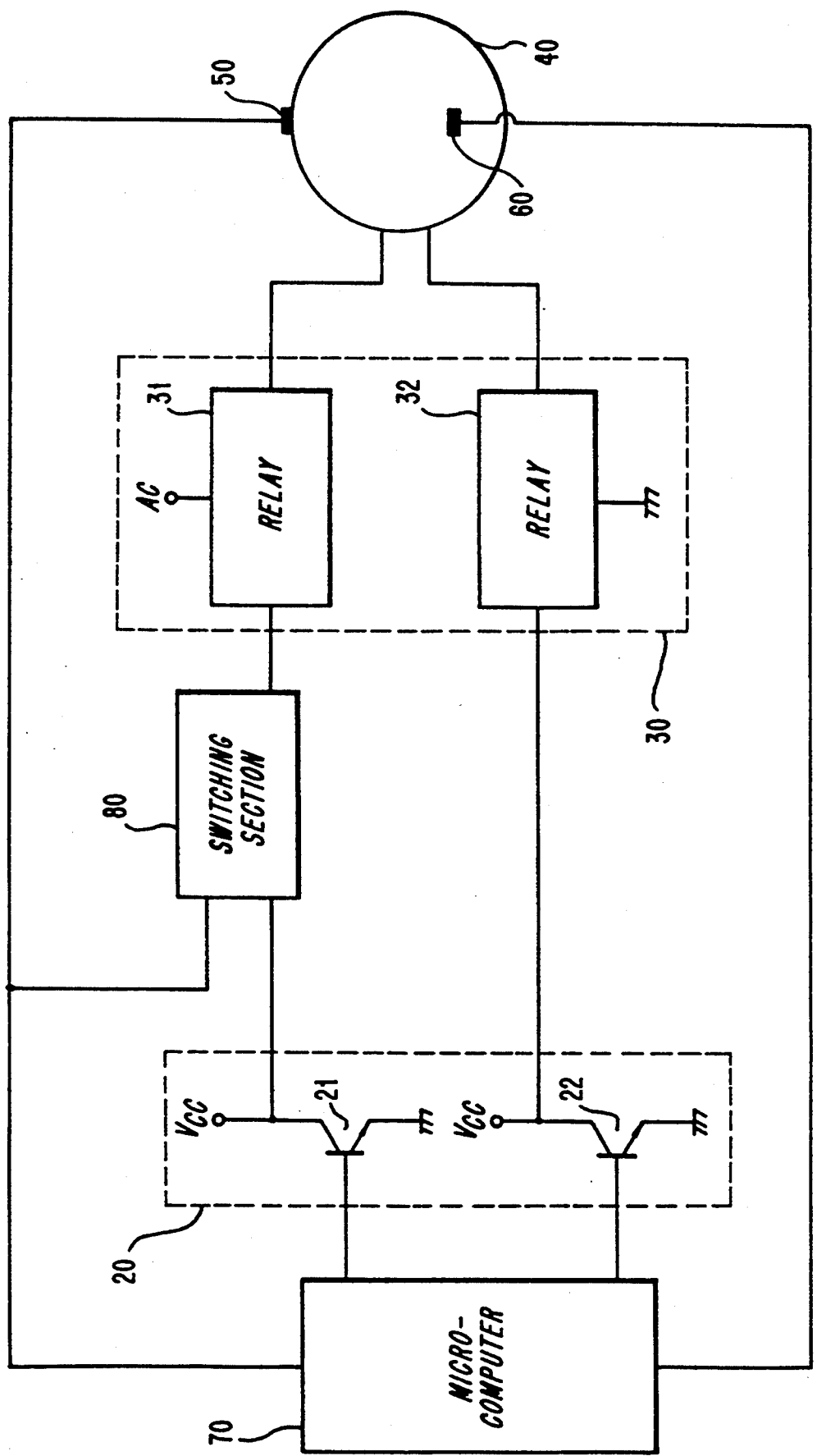
FIG. 5 is another heater drive control circuit according to a second preferred embodiment of the invention.

In FIGS. 2, 3 and 5, the load drive section and the power supply switching section have the same construction and functions as those shown in FIG. 1, and so are marked with the same numerals. On the other hand, a new reference numeral 70 is added to the microcomputer because the microcomputer is different in its control program. As shown in FIG. 4, the microcomputer 70 comprises a heater temperature sensing section 11, a water temperature sensing section 12, a first and second temperature comparing sections 13 and 14, an AND gate 16, an OR gate 17 and a temperature increment calculating section 15. Referring back to FIG. 2, a first thermistor 50 is mounted on a bracket, not shown, which is in contact with the heater 40 so that it can detect the heater temperature. A second thermistor 60 is mounted at the proper position on the surface of the tub so that it can detect the water temperature supplied to the tub (not shown).

The heater temperature sensing section 11 detects the temperature of the heater 40 through its input terminal which is connected with the first thermistor 50 and outputs a first temperature sensing signal corresponding to the temperature of the heater 40 to the first and second temperature comparing sections 13 and 14 and the temperature increment calculating section 15. The water temperature sensing section 12 detects the temperature of the washing water supplied to the tub through the second thermistor 60 connected with its input terminal and outputs a second temperature sensing signal corresponding to the temperature of the washing water to the second temperature comparing section 14.

The first temperature comparing section 13 compares the first temperature sensing signal with a reference signal corresponding to an overheating setting temperature, for example 106° C., and outputs a control signal to the temperature increment calculating section 15 and the OR gate 17 according to the result of the comparison. The second temperature comparing section 14, which is triggered by a control signal from the temperature increment calculating section 15, determines whether the second temperature sensing value is higher than a value corresponding to the sum of the heater temperature and a predetermined value, for example 30° C.

The temperature increment calculating section 15, which is triggered by a control signal from the first temperature comparing section 13, calculates a temperature increment for a predetermined time period, for example 30 seconds, by the first temperature sensing signal, and compares the calculated value with a predetermined reference value, for example, 13° C. per 30 seconds. On the other hand, the AND gate receives the signals from the second temperature comparing section 14 and the temperature increment calculating section 15. The OR gate 17 receives the signals from the AND gate 16 and the first temperature comparing section 13 and outputs a load drive control signal to the load drive section 20.

Hereinafter, an overheat preventing method will be described with reference to FIG. 3. If the machine user turns the power switch of the washing machine "on", the microcomputer 70 is initialized and all default values such as a set temperature value for heater overheating and a reference value for the heater temperature increment, etc., are established on the microcomputer 70 at stage 31. As an initializing operation like this is within an artisan's ordinary skill in the art, further description herein will be omitted. At stage 32 following the initializing operation, it is determined whether the heater temperature $T_H$ is higher than an overheating setting temperature, for example, 106° C. If $T_H$ is higher than 106° C., microcomputer 70 determines that the heater is overheating and it outputs a control signal to the load drive section 20 to cut off the power supply to the heater 40 and it activates an alarm to inform the user of the abnormal condition in the washing machine at stage 38. Heater overheating like this mainly occurs when the heater 40 is operated under the condition that the water is not supplied to the tub due to a malfunction of the load drive section 20 or power supply switching section 30.

On the other hand, if $T_H$ is not higher than 106° C. at stage 32, the flow chart proceeds to stages 33 through 35. At stages 33 through 35, a counter or timer, not shown, in the microcomputer 70 calculates whether the temperature increments of the heater 40 per 30 seconds $\Delta T_H$ is higher or equal to 13° C. If $\Delta T_H$ is higher than or equal to 13° C., it is determined whether the predetermined time, for example 30 seconds, has elapsed at stage 36. If 30 seconds have elapsed, in other words, if $\Delta T_H$ is above 13° C. for more than 30 seconds, the microcomputer 70 determines that the heater 40 is not in an overheating condition but in a normal heating condition and performs an ordinary boiling water washing routine at stage 39. If 30 seconds have not elapsed, in other words, if $\Delta T_H$ is higher than or equal to 13° C. within 30 seconds, it is determined whether the water temperature $T_W$ is higher than $T_H$ plus a predetermined value, for example 30° C., at stage 37. This case mainly occurs when warm water, having a temperature in the range from 60° C. to 90° C. in supplied into the tub. Accordingly, this stage is provided so that the ordinary boiling water washing routine may be performed, even though $\Delta T_H$ is above 13° C. within 30 seconds, if $T_W$ is higher than or equal to $T_H$ plus 30° C. On the other hand, If $T_W$ is not higher than or equal to $T_H$ plus 30° C. at stage 37, which mainly occurs when there is an insufficient supply of water to the tub, it is then determined that the heater 40 is in an overheating condition, and thus the power supply to the heater 40 is cut off and an alarm sounds to inform the user that the washing machine is in an abnormal condition.

Next, another embodiment of the invention will be described. In FIG. 5, a switching section 80 is further provided between the collector of the first transistor 21 and the first relay 31, and also connected with the first thermistor 50. When the heater temperature detected through the first thermistor 50 is higher than 106° C., the switching section 80 effectively cuts off the power supply to the heater 40 even if the microcomputer 70 malfunctions. On the other hand, as not shown, additional thermostatic switches may be provided, which operate when the heater temperature is higher than 106° C., as another method to prevent overheating.

I claim:

1. An overheating prevention apparatus for use in a boiling water clothes washing machine including a heater for boiling clothes with hot wash water, said apparatus comprising:
   heater temperature sensing means for generating a first sensed temperature signal corresponding to a sensed temperature of said heater;
   a first temperature comparing section for comparing said first sensed temperature signal with an overheating temperature reference signal and outputting a first comparison result signal;
   water temperature sensing means for generating a second sensed temperature signal corresponding to the temperature of said washing water;
   a second temperature comparing section for comparing said second sensed temperature signal with a sum of said first sensed temperature signal and a predetermined value, and for generating a second comparison result signal; and
   power supply switching means for operating said heater in accordance with said first comparison result signal and said second comparison result signal.

2. An overheating prevention apparatus for use in a boiling water clothes washing machine including a heater for boiling clothes with hot wash water, said apparatus comprising:
   heater temperature sensing means for generating a first sensed temperature signal corresponding to a sensed temperature of said heater;
   a first temperature comparing section for comparing said first sensed temperature signal with an overheating temperature reference signal and outputting a first comparison result signal;
   water temperature sensing means for generating a second sensed temperature signal corresponding to the temperature of said washing water;
   a second temperature comparing section for comparing said second sensed temperature signal with a sum of said first sensed temperature signal and a predetermined value, and for generating a second comparison result signal;
   a temperature increment calculating section for calculating a temperature increment value for a predetermined time period by said first sensed temperature signal, for comparing the calculated temperature increment value with a predetermined reference value, and for generating a third comparison result signal; and
   power supply switching means for operating said heater in accordance with said first, second and third comparison result signals.

3. An apparatus according to claim 2, wherein said power supply switching means comprises an AND gate for receiving said second comparison result signal from said second temperature comparing section and said third comparison result signal from said temperature increment calculating section and for providing an AND gate output.

4. An apparatus according to claim 3, wherein said power supply switching means further comprises an OR gate for receiving said AND gate output from said AND gate and said first comparison result signal said first temperature comparing section, and for providing an OR gate output.

5. An apparatus according to claim 4, wherein said power supply switching means comprises a load drive section for receiving said OR gate output from said OR gate and outputs a load drive.

6. An apparatus according to claim 5, wherein said heater temperature sensing means includes:
   a first thermistor for sensing the temperature of said heater; and
   a heater temperature sensing section for generating said first sensed temperature signal corresponding to the temperature of said heater.

7. An apparatus according to claim 1, wherein said water temperature sensing means includes:
   a second thermistor for sensing the temperature of the washing water supplied to a tub; and
   a water temperature sensing section for generating said second sensed temperature signal corresponding to the temperature of said washing water.

8. An apparatus according to claim 6, wherein said power supply switching means for operating said heater includes at least two relays for operating said heater.

9. An apparatus according to claim 8, wherein said load drive section including at least two transistors for receiving and operating in accordance with said OR gate output from said OR gate.

10. An apparatus according to claim 9, wherein said power supply switching means further comprises a switching section connected between one of said transistors and one of said relays, for determining whether the temperature sensed by said first thermistor is higher than a predetermined reference signal corresponding to an overheating setting temperature, and thereby switching off the power supply to said heater.

11. A method for prevention of overheating in a boiling water clothes washing machine including a heater for boiling clothes with hot washing water, said method comprising the steps of:
   determining whether the heater temperature is higher than a predetermined value;

cutting off the power supply to said heater when the heater temperature is higher than said predetermined value;

determining whether an incremental temperature change for a predetermined time period of said heater is lower than a predetermined temperature incremental value, when said heater temperature is below said predetermined value; and performing a boiling water washing cycle, when said determined incremental temperature change is less than said predetermined temperature incremental value.

12. A method in accordance with claim 11, wherein said power supply cut off step includes issuing an alarm.

13. A method for prevention of overheating in a boiling water clothes washing machine including a heater for boiling clothes with hot washing water, said method comprising the steps of:

determining whether the heater temperature is higher than a predetermined value;

cutting off the power supply to said heater when the heater temperature is higher than said predetermined value;

determining whether an incremental temperature change for a predetermined time period of said heater is lower than a predetermined temperature incremental value, when said heater temperature is below said predetermined value;

determining whether the wash water temperature is higher than the heater temperature by a predetermined value, when said determined incremental temperature change is not less than said predetermined temperature incremental value;

cutting off the power supply to said heater when the heater temperature is higher than said predetermined value or the water temperature is not less than the heater temperature by said predetermined value; and performing a boiling water washing cycle, when said determined incremental temperature change is not less than said predetermined temperature incremental value, or when the water temperature is not less than said heater temperature by said predetermined value.

14. A method in accordance with claim 13, wherein said power supply cut off step includes issuing an alarm.

* * * * *